(12) United States Patent
Kleine et al.

(10) Patent No.: US 6,405,723 B2
(45) Date of Patent: *Jun. 18, 2002

(54) SUCTION TOOL

(75) Inventors: Werner Kleine, Achim; Hans-Werner Bongers-Ambrosius, Munich, both of (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

This patent is subject to a terminal disclaimer.

(21) Appl. No.: 09/750,659

(22) Filed: Dec. 29, 2000

(30) Foreign Application Priority Data

Jan. 3, 2000 (DE) .......................................... 100 00 012

(51) Int. Cl.$^7$ ................................................. B28D 1/26
(52) U.S. Cl. .......................... 125/40; 175/417; 175/425; 175/428
(58) Field of Search ........................... 125/40, 1, 23.01, 125/41; 175/418, 420.1, 414, 415, 416, 417, 425, 426, 428, 432

(56) References Cited

U.S. PATENT DOCUMENTS 6,189,633 B1 * 2/2001 Kleine et al. ................ 175/418

* cited by examiner

*Primary Examiner*—Timothy V. Eley
(74) *Attorney, Agent, or Firm*—Sidley Austin Brown & Wood, LLP

(57) ABSTRACT

A tool for effecting drilling and/or chiseling and including a tubular shaft (2,22) having an axially extending through-channel (8,28) and provided, at one of its axial ends, with a drilling or chiseling head (5), and a connection member (3,23) connected with another of axial ends of the shaft and provided at its end remote from the shaft (2,22) with a shank (4,24), the through-channel (8,28) being connected with the tool circumference by a cross-bore (7,27), and the largest cross-sectional surface (A1,A4) of the connection member (3,23) corresponding at least to 2.5 times of the largest cross-sectional surface of the shank (4,24).

8 Claims, 2 Drawing Sheets

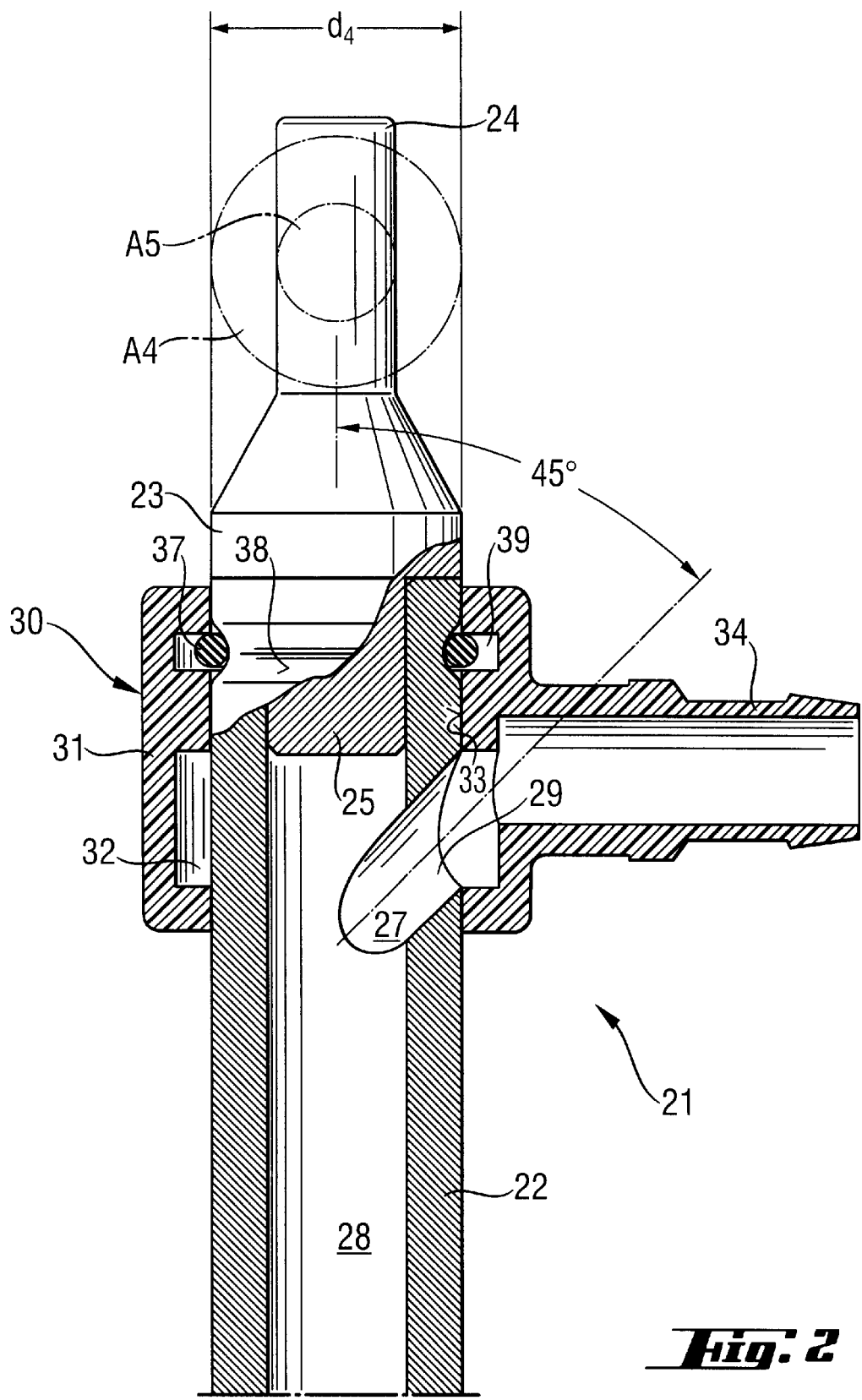

US 6,405,723 B2

SUCTION TOOL

BACKGROUND OF THE INVENTION

1. Field of the Invention

The present invention relates to a tool for effecting drilling and/or chiseling and including a tubular shaft having an axially extending through-channel and provided, at one of its axial ends, with a drilling or chiseling head, a connection member connected with another of axial ends of the shaft, a cross-bore connecting the through-channel of the shaft with a tool circumference, and a shank provided at an end of the connection member remote from the shaft.

2. Description of the Prior Art

Tools of a type described above are used for drilling or chiseling in stone, concrete, brickwork and similar brittle materials. E.g., tools are known in which the drillings are transported from the drilled or chiseled bore via at least one helical discharge groove provided on the drilling or chiseling tool. Also known are so-called suction drilling or chiseling tools one of which is disclosed in German Publication DE 198 10 192A1. The tool described in the German Publication has a tubular shaft with an axially extending through-channel and a drilling head provided at the front, free end of the shaft which is connected, at its end remote from the drilling head, with a connection member that connects the tool with a suction device.

The suction device, which is connected with a vacuum-producing device, e.g., a vacuum cleaner, serves for removal of the drillings or chips from the drilled or chiseled bore. The suction device has a housing which surrounds the tool and into which the cross-bore, which is connected with the through-channel of the shaft, opens.

A tool of this type, in which the connection member is connected with the shaft by a conventional joining technique, insures its cost-effective manufacturing. However, its manufacturing advantage leads to its applicational disadvantage. It is to be pointed out that a tool of this type is used with a hand-held mechanized tool into which it is inserted with its shank. The mechanized tool transmits, via the shank, to the tool both rotational movement and impact translateral movement. The impacts, which are applied to the tool, often cause fracture or breaking in the transitional region between the shaft and the connection member. The danger of breaking is particularly great when tool having a small diameter are used. This is because when small diameter tools are used with hand-held mechanized tools, a larger power is transmitted to the tool as a result of impacts. The fracture or breakdown results in a premature failure of the tool long before the tool becomes unusable due to wear.

Accordingly, an object of the present invention is to provide a tool of the type discussed above in which the premature failure is prevented while manufacturing advantages are retained.

SUMMARY OF THE INVENTION

This and other objects of the present invention, which will become apparent hereinafter, are achieved by providing a connection member a cross-sectional surface of which is at least in 2.5 times larger than the cross-sectional section of the shank.

Proceeding from a premise that the dimensioning of the shank of a tool is effected dependent on a power of a mechanized tool the working tool is used with, the dimensioning of the connection member according to the invention is based on knowledge that concentration of mass primarily in the region adjacent to the shank results in a certain absorption of the impact energy. Because of the dimensioning of the connection member according to the present invention, it absorbs so much impact energy that due to different mass characteristics of the shaft and the connection member, no breakdown in transition region between these elements takes place.

It was found that for preventing breakdowns and fractures, it is advantageous when the largest cross-sectional surface of the connection member is approximately equal to 4 times of the largest cross-sectional surface of the shank.

The danger of breakdowns is particularly great when the tool has a small diameter as in this case, the difference in mass between the connection member and the shaft is particularly crucial. Because with a small diameter tool, little impact energy is needed, the mass concentration in the region adjacent to the shank, which leads to the impact energy absorption, is particularly noticeable. In order to insure the proper dimensioning of the connection member, the diameter of the connection member should at least correspond to the diameter of the drilling or chiseling head. To achieve this prerequisite, different forms of the inventive tool are contemplated, e.g., the shaft can have a smaller diameter than the connection member. For tools having large diameters, there exists a possibility to form the shaft with a diameter that corresponds to the diameter of the connection member. In this case, the shaft mass contributes to the mass accumulation in the region adjacent to the shank, and the mass of the connection member can be reduced.

When the connection member has sufficiently large dimensions, preferably, the cross-bore is formed in the connection member, providing a connection between the through-channel of the shaft and the suction device housing that surrounds the connection member.

When it is the shaft that contributes to the mass concentration in the region adjacent to the shank, the cross-bore is preferably formed in the rear region of the shaft. In this case, the connection member can be made very short which results in its low cost and in economy of material.

In order to insure a reliable removal of drillings from a drilled bore, the through-channel and the cross-bore should have an adequately large diameter. It is particularly advantageous when the through-channel and the cross-bore have the same diameter. In order to optimize the removal of the drillings or chips from the fluidic point of view, advantageously, the cross-bore is so formed that at least a portion of the cross-bore forms with the axis of the connection member an angle from about 30° to 70°.

When at least a portion of the cross-bore forms with the connection member axis an angle of about 45°, in addition to fluidic advantages, manufacturing advantages are achieved. An angle of 45° can be easily formed with the existing manufacturing equipment. This advantage is achieved independently of whether the cross-bore is formed in the connection member or in the rear region of the shaft.

As it is known from the state of the art, a conventional joining technology can be used from connecting the shaft with the connection member. In order to further improve the connection between the shaft and the connection member when the conventional joining technology is used, an economical geometrical design of the elements of the tool should be undertaken. This connection is further improved when, preferably, the connection member has a journal an outer diameter of which corresponds to the inner diameter of the shaft through-channel. In this case the inner profile of the through-channel leads to the increase of the joining surface.

The journal is formed as a complementary member to the inner profile of the through-channel. The journal is provided at an end of the connection member opposite the shank. Providing of the journal is particularly preferable when the connection member has a short axial end, and the cross-bore is formed in the rear end of the shaft.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show:

FIG. 2 a partial cross-sectional view of another embodiment of a tool according to the present invention with a suction device.

DETAILED DESCRIPTION OF THE PREFERRED EMBODIMENT

Figure 1:
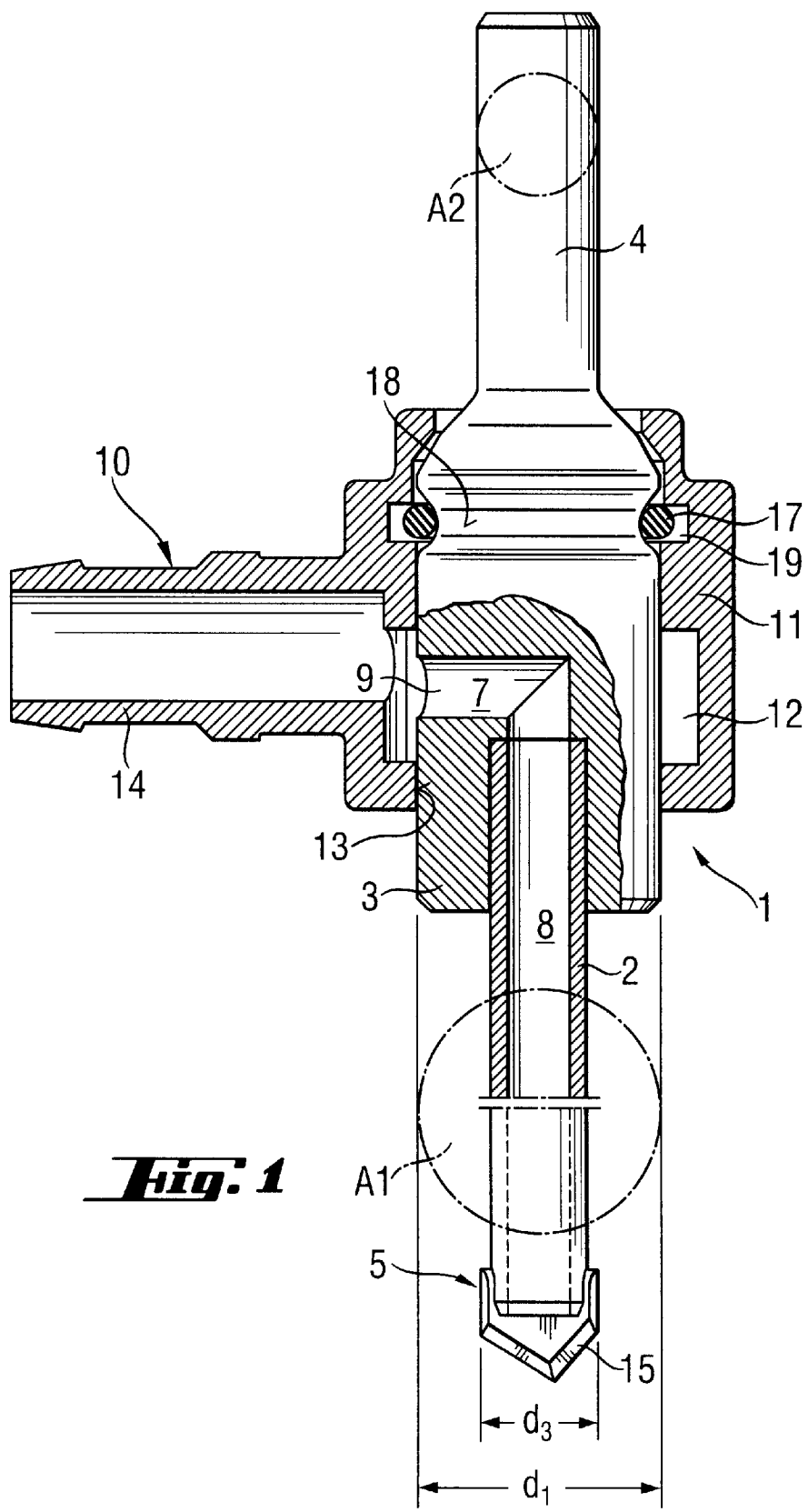
FIG. 1 a partially cross-sectional view of a tool according to the present invention with a suction device.

A tool according to the present invention, which is shown in FIG. 1, includes a tubular shaft 2, a connection member 3, and a shank 4. In the region of the connection member 3, the tool is surrounded by a suction device 10. The connection member 3 has a diameter $d_1$ and a cross-section A1, and the shank 4 has a cross-section A2.

The tubular shaft 2 has an axially extending through-channel 8 and is provided at its free end with a drilling head 5 having a diameter $d_3$. At its opposite end, the shaft 2 is connected with the connection member 3. The shank 4 serves for insertion of the tool in a hand-held mechanized tool (not shown). The connection member 3 has a cross-bore 7 that opens into the through-channel 8 of the shaft 2, and an opening 9 formed in the circumferential surface of the connection member 3. The suction device 10 has a housing 11 which surrounds the connection member 3 along a substantial portion of the longitudinal or axial extent of the connection member 3. The housing 11 forms, together with the circumferential surface of the connection member 3, a suction chamber 12 into which the opening 9 of the connection member 3 opens. The contact surface 13 of the housing 11 sealingly engages the circumferential surface of the connection member 3. A suction nipple 14, which is provided on the housing 11, opens into the suction chamber 12.

In its region adjoining the shank 4, the connection member 3 has an O-ring 17 which, preferably, partially surrounds the circumference of the connection member 3 and is located in a groove 18 formed in the circumferential surface of the connection member 3. The groove 18 extends over the entire circumference of the connection member 3 and has a depth such that the O-ring 17 partially projects beyond the circumference of the connection member 3. The housing is has a groove 19 into which the projecting portion of the O-ring 17 extends. This provides for a releasable connection of the housing 11 of the suction device 10 with the connection member 3.

The drilling head 5, which is provided at the free end of the shaft to 2, has a bit 15 formed of a hard metal. The drilling head 5 is connected with the free, front end of the shaft 2, e.g., by welding or soldering.

FIG. 2 shows another embodiment of a tool according to the present invention which is generally designated with a reference numeral 21. The tool 21 includes a tubular shaft 22, a connection member 23, and a shank 24. In the tool 21, the diameter of the shaft 22 is substantially equal to the diameter of the connection member 23.

In the region of the connection member 23, the tool 21 is surrounded by a suction device 30. The connection member 23 has a diameter $d_4$ and a cross-section A4. The shank 24 has a cross-section A5.

The tubular shaft 22 has an axially extending through-channel 28 and is connected at one of its ends with the connection member 23. The shank 24 serves for insertion of the tool 21 in a chuck of a hand-held mechanized tool (not shown in the drawings). The shaft 22 has a cross-bore 27 which opens into the through channel 28 of the shaft 22. The cross-bore 27 has an opening 29 which is formed in the circumference of the shaft 22.

The suction device 30 includes a housing 31 which completely surrounds the connection member 23 along a portion of its longitudinal or axial extent. The housing 31 forms with the circumferential surface of the connection member 23 a suction chamber 32 into which the opening 29 of the cross-bore 27 opens. The contact surface 33 of the housing 31 sealingly engages the circumferential surface of the connection member 23. A suction nipple 34, which is provided on the housing 31, opens into the suction chamber 32.

In its region adjoining the shank 24, the connection member 23 has an O-ring 37 which, preferably, partially surrounds the circumference of the connection member 23 and is located in a groove 38 formed in the circumferential surface of the connection member 23. The groove 38 extends over the entire circumference of the connection member 23 and has a depth such that the O-ring 37 partially projects beyond the circumference of the connection member 23. The housing 31 has a groove 39 into which the projecting portion of the O-ring 37 extends. This provides for a releasable connection of the housing 31 of the suction device 30 with the connection member 23.

The connection member 23 has a journal 25 the diameter of which corresponds to the diameter of the through-channel 28 of the shaft 22. The journal 25 is connected with the shaft 22 by any of conventional joining techniques, e.g., by welding, soldering, gluing . . .

The cross-bore 27 extends to the axis of the connection member 23 approximately at an angle of 45°.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A tool for effecting at least one of drilling and chiseling, comprising a tubular shaft (2,22) having an axially extending through-channel (8,28) and provided, at one of axial ends thereof, with a drilling or chiseling head (5); a connection member (3,23) connected with another of axial ends of the shaft (2,22); a cross-bore (7,27) connecting the through-channel (8,28) of the shaft (2,22) with a tool circumference; and a shank (4,24) provided at an end of the connection member (3,23) remote from the shaft (2,22), a largest cross-sectional surface (A1,A4) of the connection member (3,23) corresponding at least to 2.5 times of a largest cross-sectional surface (A2,A5) of the shank (4,24).

2. A tool according to claim 1, wherein the largest cross-sectional surface (A1, A4) of the connection member (3, 23) is equal to about 4 times of the largest cross-sectional surface (A2, A5) of the shank (4, 24).

3. A tool according to claim 1, wherein the largest cross-sectional surface (A1,A4) of the connection member (3,23) has a diameter ($d_1, d_4$) that at least corresponds to a diameter ($d_3$) of the drilling or chiseling head (5).

4. A tool according to claim 1, wherein the cross-bore (7), which connects the through-channel (8) of the shaft (2) with the tool circumference, is provided in the connection member (3).

5. A tool according to claim 1, wherein the cross-bore. (27), which connects the through-channel (28) of the shaft (22) with the tool circumference, is provided in the shaft (22).

6. A tool according to claim 4, wherein at least a portion of the cross-bore (27) extends to an axis of the connection member (23) at an angle from 30° to 70°.

7. A tool according to claim 6, wherein at least a portion of the cross-bore (27) extends to the axis of the connection member (23) at an angle of 45°.

8. A tool according to claim 5, wherein the connection member (23) has a journal (25) having a diameter corresponding to a diameter of the through-channel (28) and extending into the through-channel (28) for connecting the connection member (23) with the shaft (22).

* * * * *